Sept. 11, 1923.  
J. E. KESTERSON  
CHICKEN FEEDER  
Filed Oct. 21, 1922

1,467,329

Inventor  
J. E. Kesterson  
By Jenny A. Mathews  
Attorney

Patented Sept. 11, 1923.

1,467,329

UNITED STATES PATENT OFFICE.

JOSEPH E. KESTERSON, OF CLIO, IOWA, ASSIGNOR OF ONE-HALF TO C. R. SHRIVER AND J. R. SHRIVER, OF CLIO, IOWA.

CHICKEN FEEDER.

Application filed October 21, 1922. Serial No. 596,048.

*To all whom it may concern:*

Be it known that I, JOSEPH E. KESTERSON, a citizen of the United States, residing at Clio, in the county of Wayne and State of Iowa, have invented certain new and useful Improvements in Chicken Feeders, of which the following is a specification.

My invention relates to improvements in poultry feeders and has for an object the provision of a device of this character with adjustable means to regulate the discharge of the feed supply.

A further object of the invention is to provide means for preventing fowls over a certain size from gaining access to the feed, thereby insuring the proper feeding of the young chickens.

Another object of the invention is to provide shelter for the young chickens while feeding.

A still further object of the invention is the provision of a device of this character which can be easily taken apart for cleaning.

Other objects will be in part obvious and in part pointed out hereinafter.

Figure 1:
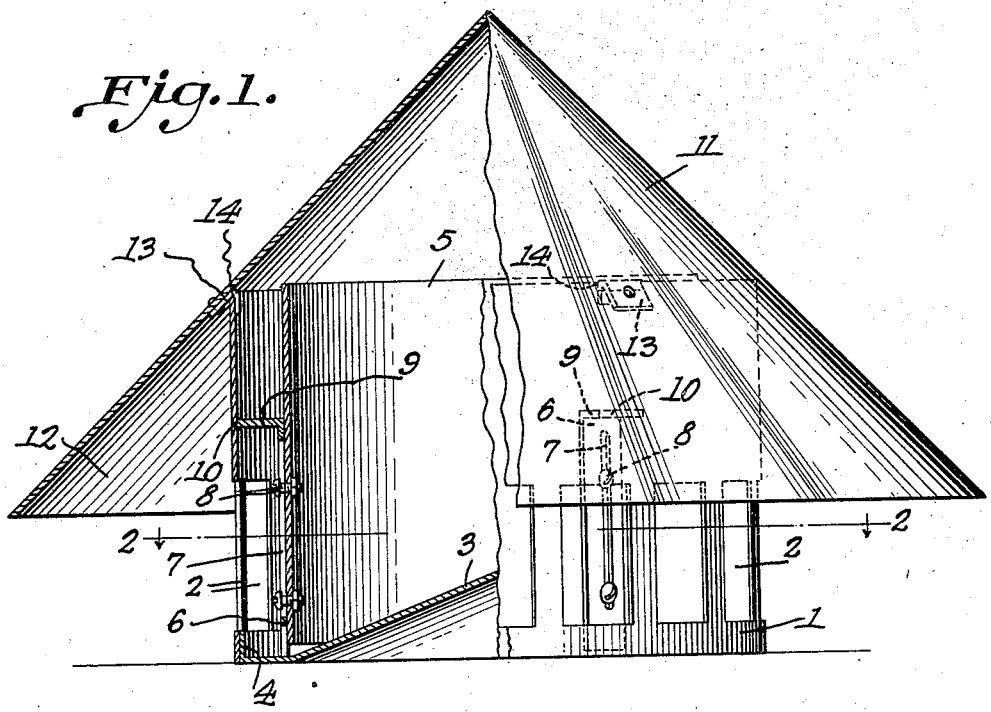
Figure 2:
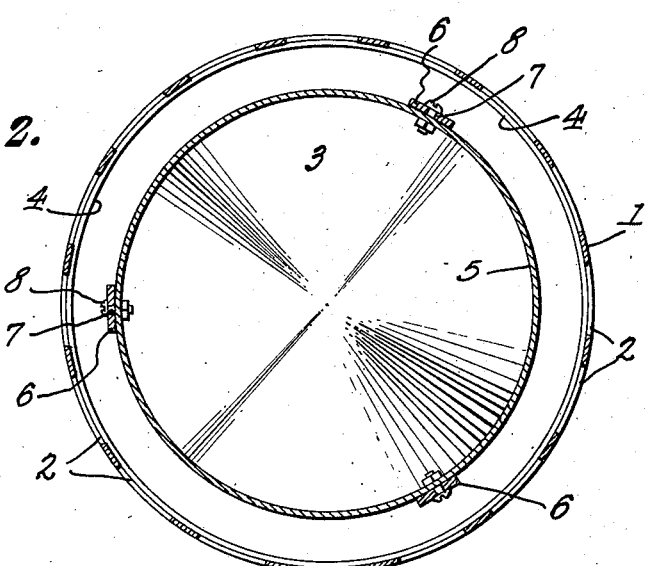

In the accompanying drawings forming a part of this specification, and in which I have shown the preferred embodiment of my invention, Figure 1 is a side elevation of the device, parts being shown in section, and, Figure 2 is a longitudinal section on line 2—2 of Figure 1.

In the drawings, wherein like characters of reference denote like or corresponding parts throughout the same, the numeral 1 designates a cylindrical casing, which is preferably formed of sheet metal, having windows or openings 2 formed in the portion nearest the ground through which the chickens may introduce their heads.

The base 3 is substantially conical in shape, the apex being in the center of the feeder, thereby causing the feed to flow outwardly to the sides so as to be accessible through the openings 2. The outer edge of the base 3 is bent upwardly to form the vertical flange 4 which fits snugly against the inside wall of the casing 1.

Concentrically arranged within the casing 1 is a hopper 5, the diameter of which is substantially less than that of the casing. The hopper is spaced from the base by a plurality of inverted L-shaped legs 6, having vertical slots 7 formed therein, which receive bolts 8, or the like carried by the hoppers 5. It can be readily seen that by means of the bolts and slots, the space between the hopper and base can be adjusted to regulate the amount of feed to be discharged through this space.

The longitudinal portions 9 of the inverted L-shaped legs have their outer edges 10 resting against the inner wall of the casing 1 and serve to space the hopper therefrom in concentric relation.

The top 11 of the feeder is substantially conical in shape and has a portion 12 which extends beyond the wall of the casing and is adapted to overhang the space directly adjacent the circumference of the feeder to exclude fowls over a certain size and to form a shelter for the young chickens feeding from the device.

Substantially inverted V-shaped brackets 13 are secured to the under side of the top 11 and are adapted to rest in recesses 14, formed in the upper edge of the casing 1, when the top is put in place on the feeder and one arm of each of the brackets 13 is adapted to lie in contact with the inner wall of the casing 1.

In use, the inverted L-shaped legs serve two purposes, that of supporting the hopper 5 and spacing the same from the walls of the casing 1. By means of the bolts 8 and slots 7, the hopper may be adjusted toward or away from the base to regulate the discharge of the feed from the hopper to the space between the outer casing and the hopper where it is easily reached by the fowls by reason of the opening 2 in the casing 1.

The overhanging portion 12 of the top serves to exclude all fowls over a certain size by reason of its proximity to the ground and also serves to protect the chickens while feeding.

In order to refill the feeder the top is removed and feed poured into the hopper and the top replaced. This operation is very simple as there are no screws or other attaching means to remove.

The entire device may be taken apart to be cleaned and reassembled without the use of any tools, as is evident from the drawings.

It is to be understood that the form of my invention herewith shown and described is to be taken as a preferred embodiment of the same, and that various changes in the shape, size, form and arrangement of parts may be resorted to without departing from the spirit of my invention, or the scope of the subjoined claims.

Having thus described my invention, what I claim is:

1. In a poultry feeder of the class described, a substantially cone-shaped base having its edge upturned to form a flange, a casing adapted to snugly receive said flange and having openings arranged therein, a hopper having both ends open and adapted to be concentrically arranged within the casing, inverted L-shaped brackets adjustably secured to the hopper and adapted to support the same at a distance from the base and to space the hopper from the casing, and a conical cover adapted to rest on the upper edge of the casing and having its lower end overhanging the casing to form a shelter for the younger chickens and to exclude the larger fowls.

2. In a poultry feeder, a substantially conical feed spreading base having its edge upturned to form a vertical flange, an apertured cylindrical casing adapted to snugly receive the vertical flange and having notches formed in its upper periphery, a cylindrical hopper open at both ends and concentrically arranged within the casing but spaced from the base, the diameter of the hopper being substantially less than the diameter of the casing, inverted L-shaped brackets having longitudinal slots adapted to receive bolts carried by the hopper, said brackets adapted to space the hopper from the base and from the casing, a conical cover adapted to rest on the upper periphery of the casing and having its lower portion overhanging said casing thereby forming a shelter about the casing and preventing the larger fowls from gaining access to the feed, and substantially V-shaped brackets secured to the under side of the conical cover and adapted to be received by the notches formed in the casing.

In testimony whereof I affix my signature.

JOSEPH E. KESTERSON.